(12) United States Patent
Wang et al.

(10) Patent No.: US 6,563,490 B1
(45) Date of Patent: May 13, 2003

(54) THIRD-AXIS INPUT DEVICE OF MOUSE

(76) Inventors: Ching-Shun Wang, 2F, No. 550, Min Tsu E. Rd., Taipei (TW); Cheng-Liang Hsieh, 7F, No. 142-1, Lane 108, Sec. 1, Kuang Fu Rd., E. Dist., Hsin Chu (TW); Shu Feng Lu, 4F, No. 19, Shin-Chien St., Pei-Tou, Taipei (TW)

( * ) Notice: Subject to any disclaimer, the term of this patent is extended or adjusted under 35 U.S.C. 154(b) by 0 days.

(21) Appl. No.: 09/492,039

(22) Filed: Jan. 27, 2000

(51) Int. Cl.7 ................................................ G09G 5/08
(52) U.S. Cl. ...................................... 345/165; 345/166
(58) Field of Search ................................ 345/163, 164, 345/165, 166

(56) References Cited

U.S. PATENT DOCUMENTS

| | | | | |
|---|---|---|---|---|
| 5,095,303 A | * | 3/1992 | Clark et al. ................. | 345/164 |
| 5,313,230 A | * | 5/1994 | Venolia et al. .............. | 345/163 |
| 5,446,481 A | * | 8/1995 | Gillick et al. ............... | 345/163 |
| 5,530,455 A | * | 6/1996 | Gillick et al. ............... | 345/163 |
| 5,808,568 A | * | 9/1998 | Wu .............................. | 341/20 |
| 5,912,661 A | * | 6/1999 | Siddiqui ..................... | 345/166 |
| 5,952,997 A | * | 9/1999 | Hu .............................. | 345/163 |
| 6,014,130 A | * | 1/2000 | Yung-Chou ................. | 345/163 |
| 6,137,477 A | * | 10/2000 | Hu .............................. | 345/163 |
| 6,157,369 A | * | 12/2000 | Merminod et al. ......... | 345/157 |
| 6,172,358 B1 | * | 1/2001 | Ho ......................... | 250/231.13 |
| 6,188,389 B1 | * | 2/2001 | Yen ............................. | 345/163 |
| 6,246,392 B1 | * | 6/2001 | Wu .............................. | 345/163 |
| 6,285,355 B1 | * | 9/2001 | Chang ........................ | 345/163 |
| 6,292,113 B1 | * | 9/2001 | Wu .............................. | 341/20 |

* cited by examiner

Primary Examiner—Steven Saras
Assistant Examiner—Leland R. Jorgensen

(57) ABSTRACT

A third-axis input device of a mouse comprises a hollow roller stage mounted on a base of the mouse and a hollow roller pivotally arranged on the mouse's roller stage. The roller projects from the cover of the mouse. The roller has a closed lateral surface and an open lateral surface, defining an accommodation space therein. A ring is formed on an inner side of the closed lateral surface and extends within the accommodation space. The ring has a plurality of equally spaced apart tooth-shaped strips formed on a surface thereof to function as an encoder wheel. The encoder wheel is mounted with respect to an optical means having a case, a circuit board connected to the primary circuit board of the mouse, and an infrared transceiver.

8 Claims, 8 Drawing Sheets

THIRD-AXIS INPUT DEVICE OF MOUSE

FIELD OF THE INVENTION

The present invention relates to an improved third-axis input device of mouse, especially to a third-axis input device of mouse, the roller thereof is directly transmitted to generate optical signal.

BACKGROUND OF THE INVENTION

As shown in FIGS. 1 to 3, the conventional third-axis input device 20 of mouse 10 is arranged for providing scrolling function. The mouse 10 comprises at least a base 101, a cover 102, a circuit board 103, a left button and a right button, all are well known art.

The third-axis input device 20 comprises a hollow case 1 located at a dent 104 arranged in front of the primary circuit board 103 and pivotally arranged at the base 101 of the mouse 10. The case 1 has two pivotal plates 11 on both sides thereof and having a through hole 12. The base 101 has poles 105 corresponding to the pivotal plates 11, an elastic member 106 (for example, spring) on each pole 105. The through hole 12 is hooked on top of the pole 105 and lays against the elastic member 106.

The case 1 has two retaining grooves 13 and 14 extended on two other sides thereof and a pivot rod 15 on one side thereof corresponding to a micro-switch 107.

A roller 2 is pivotally arranged within the hollow case 1. A lengthwise opening 108 is provided on the cover 102 and equal distance to the left and right buttons such that an operative portion of the roller 2 exposes out of the mouse 10 from the lengthwise opening 108.

The roller 2 has a closed lateral side and a pivot rod 21 on the lateral sides thereof and pivotally engaged with the retaining groove 13 such that the roller 2 is retained within the case 1. The roller 2 has a plurality of positioning holes 22 on the closed lateral side. The case 1 has a positioning pole 16 corresponding to the roller 2. The roller 2 has an opened lateral side and has an accommodating space 23 therein and containing a driving wheel 24 of a wheel set.

An optical means 3 is arranged within the accommodating space 23 and has a hollow housing 31, which has a clamping plate 32 on the lateral side not facing the accommodating space 23. The clamping plate 32 is engaged within the retaining groove 14. The hollow housing 31 has a cover plate 39 on the lateral side facing the accommodating space 23. A driven wheel 33 is provided to engage with the driving wheel 24 when the roller 2 rotates. The driven wheel 33 is embedded into the embedding groove 34 of the cover plate 39 through a link 331, and connected to a wheel cover 35 and an encoder wheel 36 within the housing 31. An infrared transceiver 37 is arranged at a position corresponding to the encoder wheel 36 and electrically connected to a circuit board 38, which is electrically connected to the circuit board 103 of the mouse 10.

When user rotates the roller 2, the driving wheel 24 drives the driven wheel 33 and the encoder wheel 36 is rotated accordingly. The transceiver 37 sends signal to the circuit board 38 and then to the primary circuit board 103 of the mouse 10. When user presses the roller 2, the pivot rod 15 is pressed to touch the micro switch 107 and activate the third axis input function. The case 1 lays against the pole 105 hooked by the elastic member 106, which generates a rebound force for the roller 2 and buffer the pressing force of the roller 2. When the roller 2 is not rotated, the positioning pole 16 is located within the positioning holes 22 such that the roller 2 is retained.

However, the above mentioned mouse has complicated structure and the encoder wheels of the driving wheel and the driven wheel have transmission rate error and manufacture error such that, the transmission is indirect. Therefore, the sensing time has error, the signal transmission has error and the error rate in actual use is high. Moreover, the driven wheel is locked within an embedding groove on the cover by a link rod, the alignment thereof is difficult. The assembling of such mouse is hard to automatic.

It is an object of the invention to provide an improved third-axis input device of mouse, wherein the a ring formed on the roller is modified to provide directly an encoder wheel, thus saving manufacture cost and assembling time.

It is another object of the invention to provide an improved third-axis input device of mouse, wherein the encoder wheel is directly driven with optical means, therefore, the operation is more precise and the operation time is reduced.

To achieve above objects, the present invention provides an improved third-axis input device of mouse, which comprises a hollow roller stage mounted on the base of mouse and a hollow roller pivotally arranged on the roller stage. The roller exposes out of the cover of the mouse. The roller has a closed lateral surface and an opened lateral surface to define an accommodation space therein. A ring is formed on an inner side of the closed lateral surface and extending within the accommodation space. The ring has a plurality of equal-separation tooth-shape strips on surface thereof for functioning as an encoder wheel. The encoder wheel is mounted with respect to an optical means having a case, a circuit board connected to the primary circuit board of the mouse, and an infrared transceiver.

The various objects and advantages of the present invention will be more readily understood from the following detailed description when read in conjunction with the appended drawing, in which:

DETAILED DESCRIPTION OF THE PREFERRED EMBODIMENT

Figure 1:
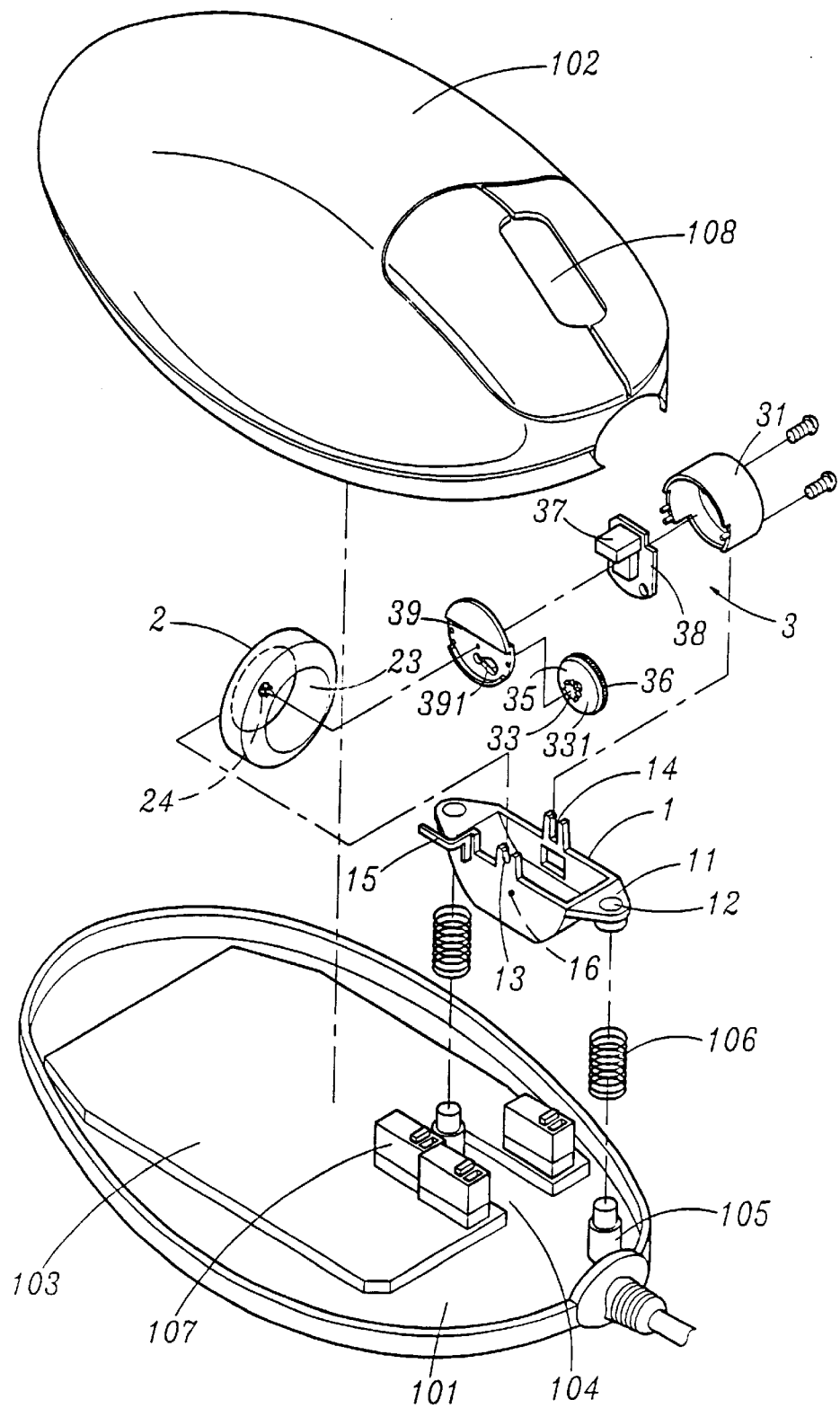
FIG. 1 is an exploded view of a prior art mouse.
Figure 2:
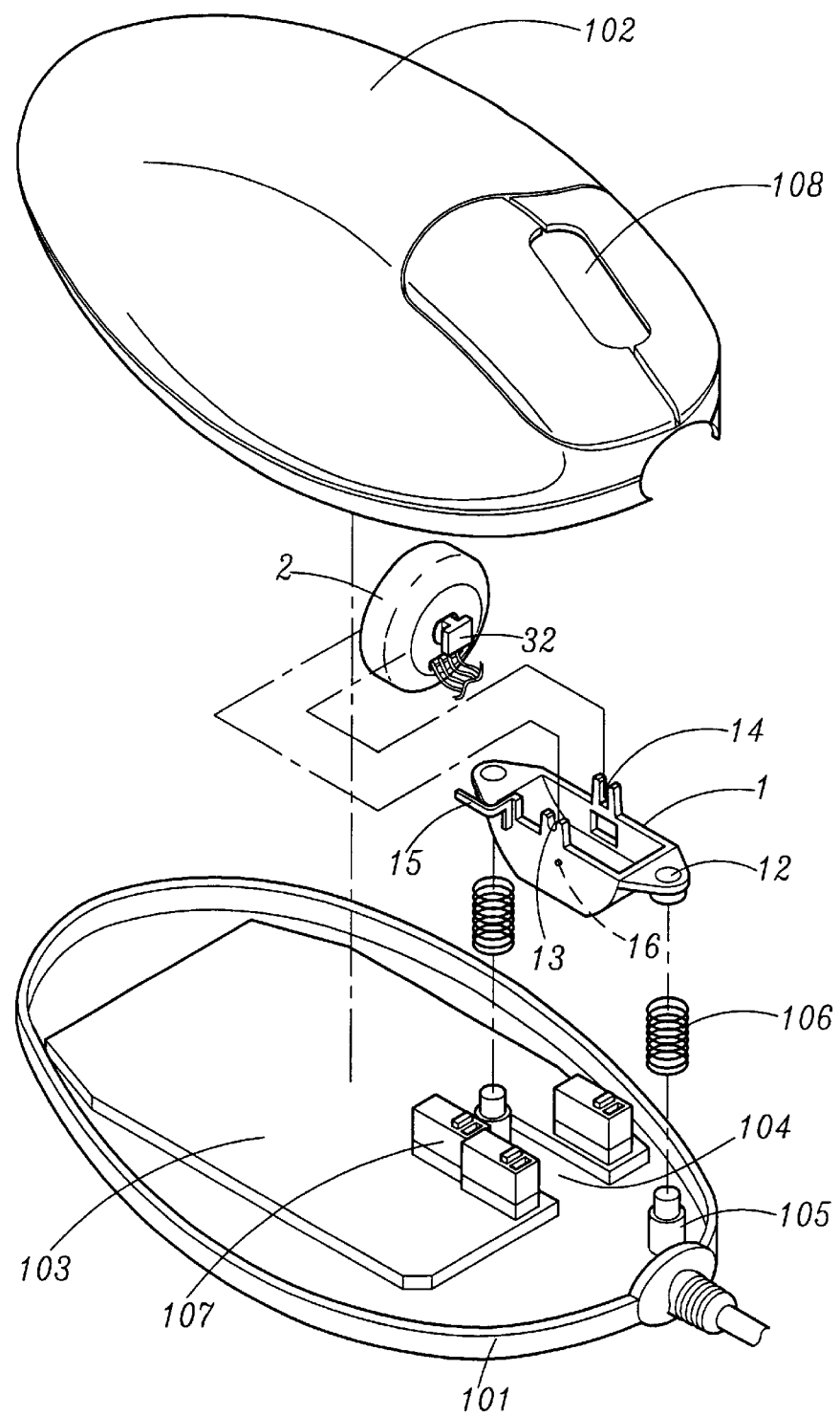
FIG. 2 is another exploded view of a prior art mouse with partial components being assembled.
Figure 3:
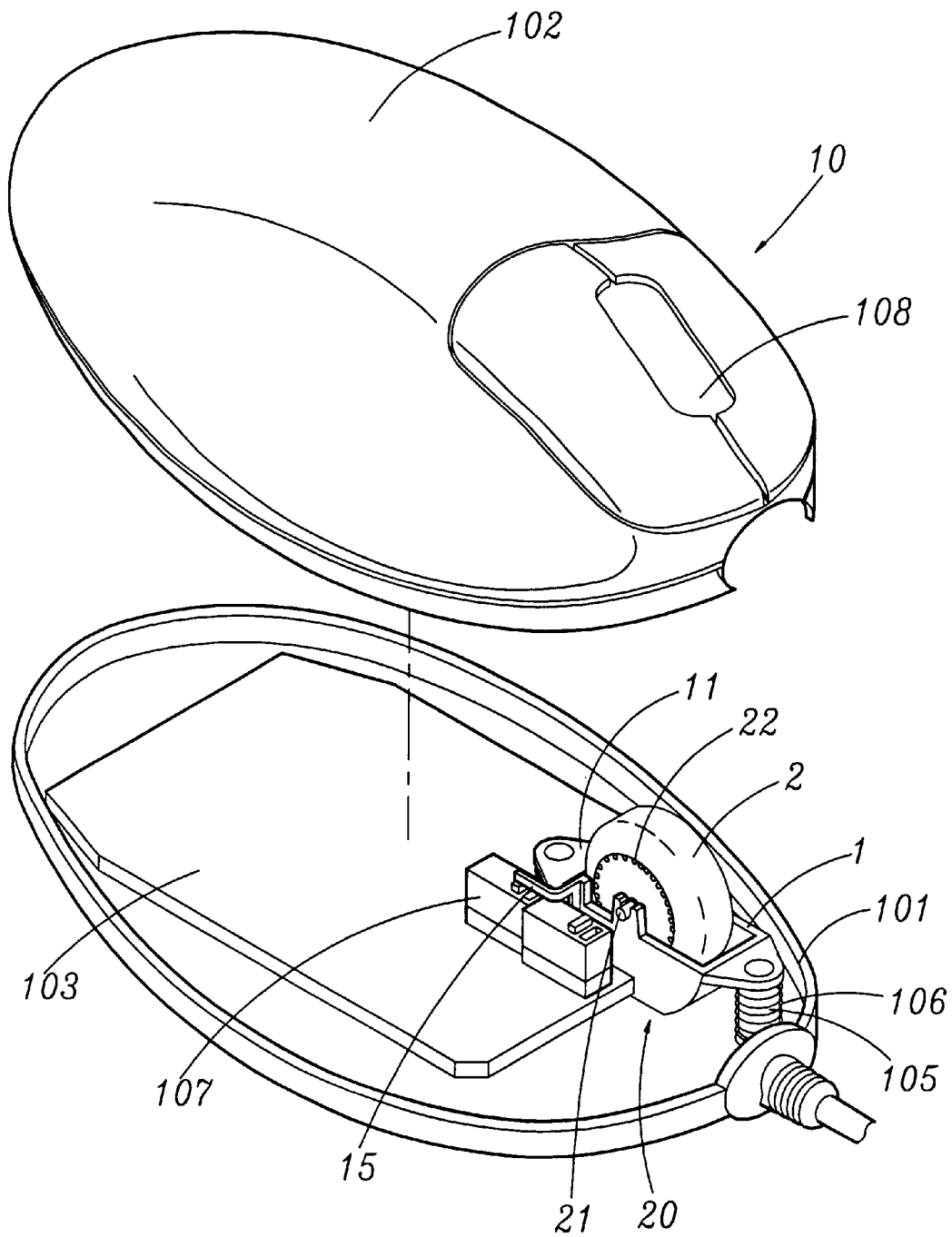
FIG. 3 is another exploded view of a prior art mouse with more components being assembled.
Figure 4:
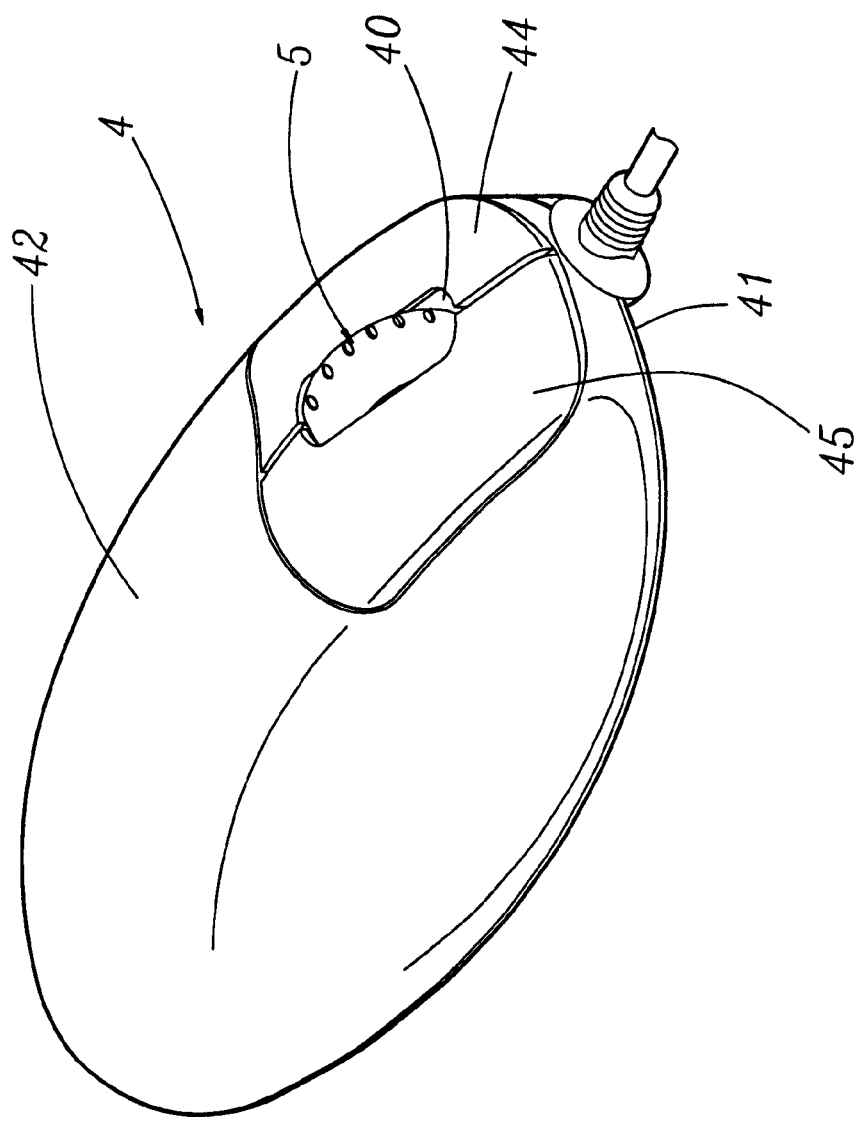
FIG. 4 is the perspective view of mouse according to the present invention.

With reference now to FIGS. 4 to 7, the present invention provides an improved clamping device for third-axis input device of mouse, wherein the mouse 4 is added with a third-axis (z-axis) input device 5 to provide the mouse 4 with scroll function. Therefore, the screen of computer can be easily scrolled up and down without moving the mouse. This kind of mouse 4 comprises a base plate 41, a cover 42, a primary circuit board 43, a left button 44 and a right button 45. Those are well known art and the detailed description thereof is omitted here for clarity.

The third-axis input device 5 has a hollow roller stage 51 located at a dent 46 arranged in front of the primary circuit board 43. The hollow roller stage 51 has two pivotal plates 52 on both sides thereof and having a through hole 53. The base 41 has poles 47 corresponding to the pivotal plates 52, an elastic member 48 (for example, spring) on each pole 47. The through hole 53 is hooked on top of the pole 47 and lays against the elastic member 48.

The roller stage 51 has a pair of locking grooves 54, 55 extended from both sides thereof. The roller stage 51 further has a pivot shaft 56 on rear side thereof and corresponding to a micro switch 49 on the primary circuit board 43.

A roller 6 is pivotally arranged within the hollow roller stage 51. A lengthwise opening 40 is provided on the cover 42 and equal distance to the left and right buttons such that an operative portion of the roller 6 exposes out of the mouse from the lengthwise opening 40.

Figure 5:
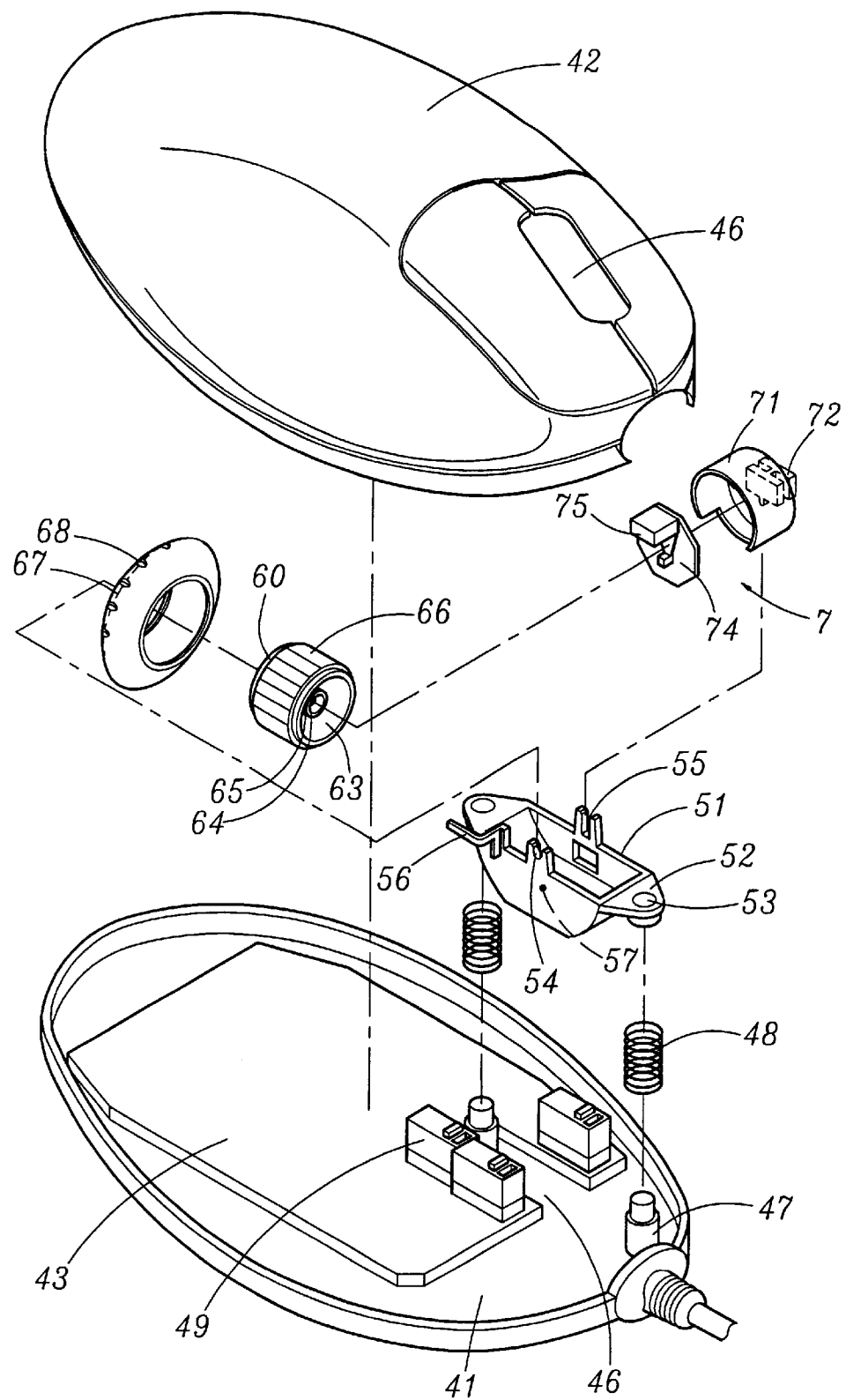
FIG. 5 is an exploded view of mouse according to the present invention.
Figure 6:
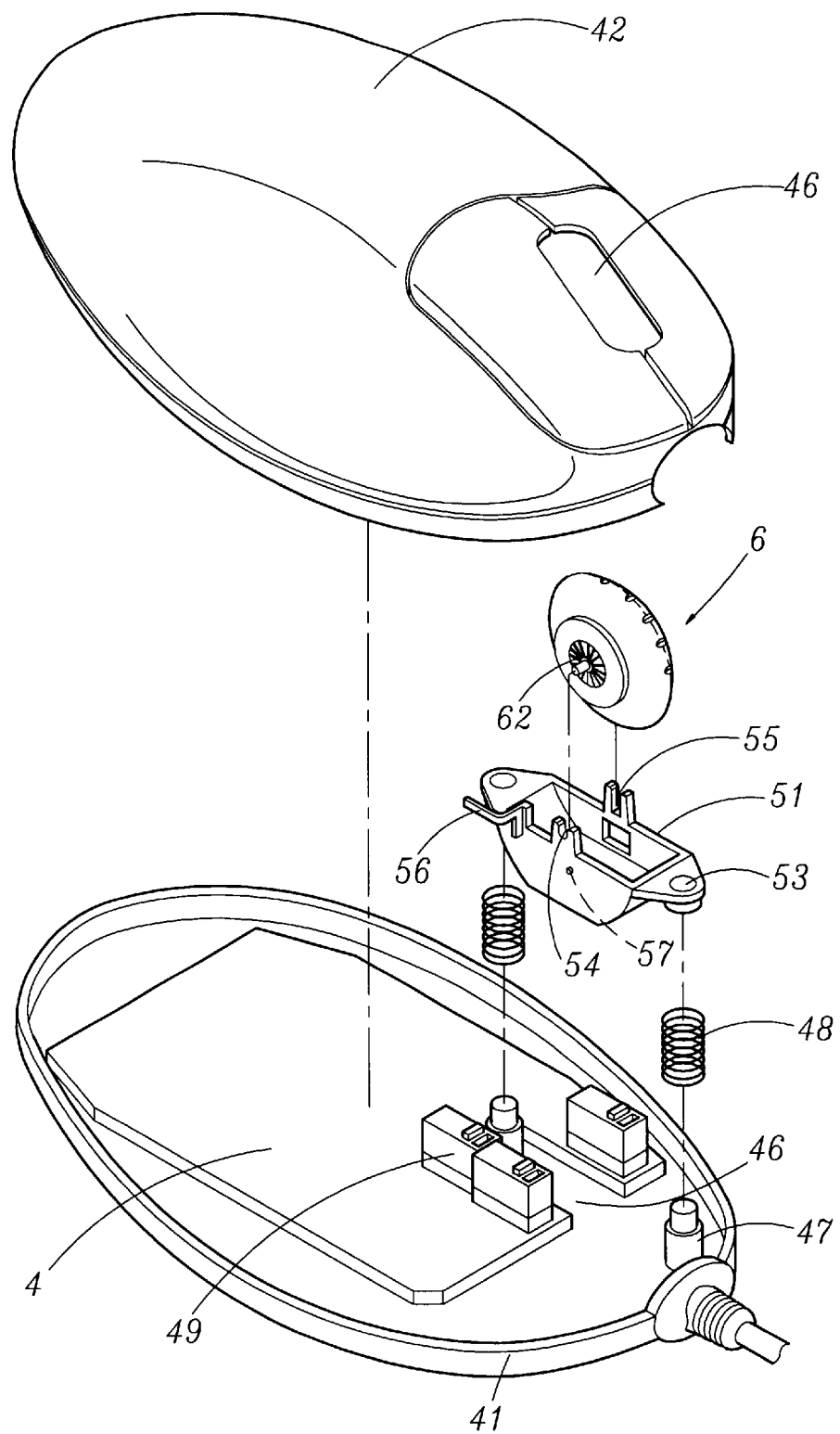
FIG. 6 is an exploded view of mouse according to the present invention with partial components being assembled.
Figure 7:
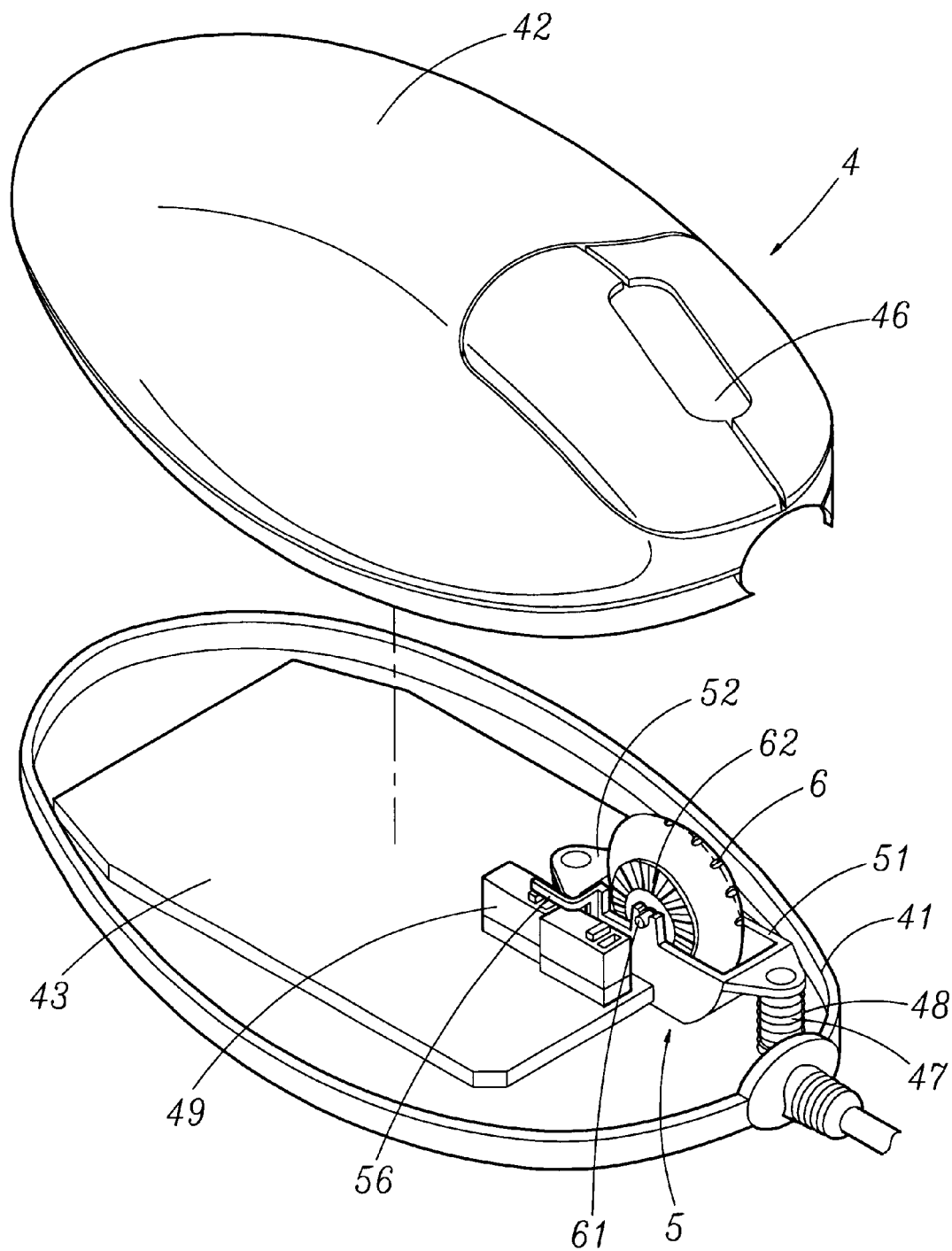
FIG. 7 is an exploded view of mouse according to the present invention with more components being assembled.
Figure 8:
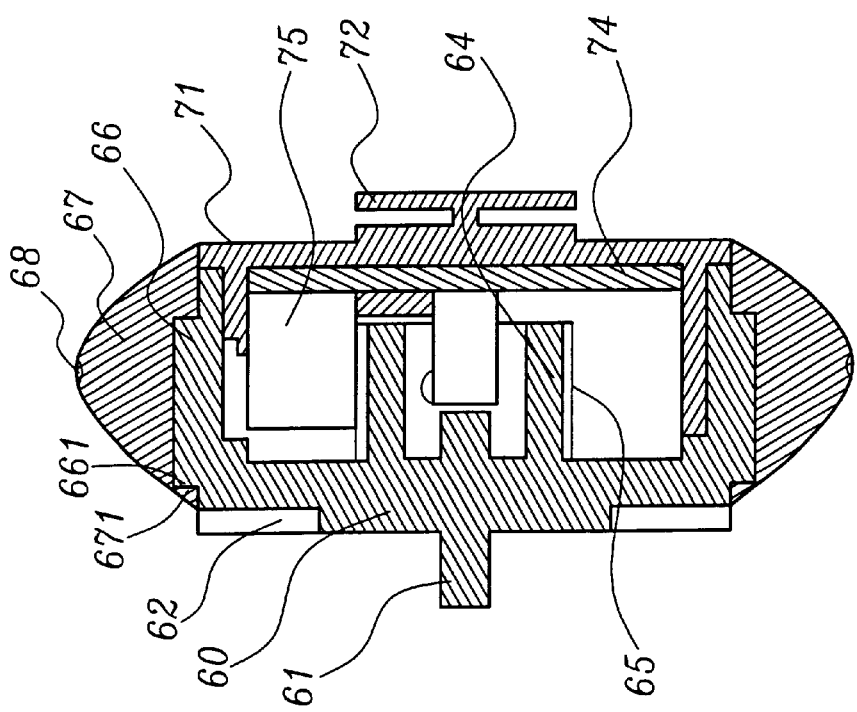
FIG. 8 is the sectional view of the roller according to the present invention.

The roller 6 has a closed lateral surface 60 and a locking pole 61 on the closed lateral surface 60 and engaged within the locking groove 54 on one side of the roller stage 51 such that one end of the roller 6 is retained on the roller stage 51. The outer part of the closed lateral surface 60 is provided with a plurality of positioning holes 62 arranged in circle pattern. The roller stage 51 has a positioning pole 57 on the surface facing the roller 6. The other lateral surface of the roller 6 is an opened surface to form an accommodating space 63 therein. A ring 64 is provided on the inner surface of the closed lateral surface 60. The ring 64 has a plurality of tooth-shape stripes 65 extended from the axis thereof. As shown in FIGS. 5 and 8, the roller 6 comprises a case 66 and a rubber wheel 67 with inner convex part engaged with the concave part of the case 66. The rubber wheel 67 has a plurality of equal-distance dents 68 on the rim thereof to enhance the tactile feeling of user and manipulation of roller 6.

The opened lateral side of the roller 6 contains an optical means 7. The optical means 7 has a case 71 arranged within the accommodating space 63 of the roller 6. The case 71 has a lock plate 72 on an outer surface thereof and engaged within locking grooves 55. The case 71 has a circuit board 74 on the inner side thereof and has an infrared transceiver 75 corresponding to a ring 64 of the roller 6. The circuit board 74 is electrically connected to the primary circuit board 43. More particularly, the infrared transceiver 75 is mounted on the circuit board 74 and has a receiver on an inner part thereof and a transmitter on an outer part thereof. The light emitted from the transmitter is refracted by the tooth-shape strips 65 on the ring 64 of the roller 6 and is detected by the receiver, thus generating a signal corresponding to key switch operation. The transmitter and emitter are connected by a connector and then mounted on the circuit board.

When user rotates the roller 6 of the third-axis input device 5, the ring 64 is directly driven to rotate. Therefore, the tooth-shape stripes 65 functioning as encoder wheel are also rotated. The infrared transceiver 75 detects the signal generated by rolling of the roller 6 of the third-axis input device 5 and generates a corresponding signal to the circuit board 74. When user press the roller 6, the pivot shaft 56 of the roller stage 51 linked with the roller 6 touches the micro switch 49 to activate the third axis input. The roller stage 51 lays against the pole 47 hooked by the elastic member 48. The elastic member 48 produces a rebound force and buffers the pressing force.

The roller 6 has a plurality of positioning holes 62 on lateral side thereof. The roller stage 51 has a positioning pole 57 on the surface facing the roller 6. The positioning pole 57 will be positioned within one of the positioning holes 62 when the roller 6 stops rotating. Therefore, the roller 6 is retained and the third-axis cursor can be fixed. The positioning holes 62 are circle holes of equal distance or equal-distance corrugations in radial distribution.

To sum up, in the present invention, an encoder wheel is directly formed by the tooth-shape strips on the ring arranged on the closed lateral surface of the roller. In comparison with the driving wheel of the conventional mouse, the ring with tooth-shape strips according to the present invention has easy manufacture due to larger size thereof. Moreover, the mouse according to the present invention does not involve with a driven wheel and a cover plate for encoder wheel, the manufacture cost and assembling effort are saved. In other word, the tasks of assembling an encoder with driven wheel and assembling a cover plate to the case of the encoder wheel are saved. The locking means between the cover and the case of the encoder wheel is also saved. The gap and transmission time error between the driving wheel and the driven wheel is overcome in the present invention. The encoder wheel is directly driven to ensure accuracy. The binary signal "0" and "1" of the encoder wheel are directly generated by the tooth-shape strips on the ring of the roller. The friction between the positioning hole and the positioning pole generates click sound to facilitate the operation of user.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A third-axis input device of a mouse comprising:
    a roller rotatably mounted on a roller stage and projecting through an opening formed in a cover of a mouse, said roller stage being mounted on a base of said mouse, said roller having a closed lateral surface and a recess formed therein;
    a ring member formed on said roller within said recess, said ring member being positioned coaxially with said roller, a plurality of tooth-shaped strips being formed on said ring member, each of said tooth-shaped strips being spaced apart an equal distance each from the other, said tooth-shaped strips defining an annular surface on said roller extending circumferentially about a rotation axis of said roller; and,
    an optical transceiver, said optical transceiver being disposed to project light radially towards said ring member, whereby said tooth-shaped strips of said rig member reflect said light back to said optical transceiver, said receiving said reflected light and generating a signal corresponding to a rotational state of said roller.

2. The third-axis input device of a mouse as recited in claim 1, wherein said optical transceiver has a case, a circuit board, and an infrared transceiver, said circuit board being electrically connected to a primary circuit board within said mouse and arranged on one side of said case facing said recess, said infrared transceiver being mounted on said circuit board and being positioned adjacent to said ring member, said case having a locking plate on a lateral side thereof, said locking plate being engaged within a locking groove on one lateral side of said roller stage.

3. The third-axis input device of a mouse as in claim 1, wherein said roller comprises a roller case and a rubber wheel, said rubber wheel having an inner convex face engaged with an outer concave face of said case, said rubber wheel having a plurality of equally spaced apart indentations formed on a rim thereof to enhance tactile fuel for a user.

4. The third-axis input device of a mouse as recited in claim 1, wherein said roller has a plurality of positioning holes formed through said closed lateral surface, said roller stage having a positioning pole formed thereon for engaging said positioning holes, said positioning pole engaging one of said positioning holes to prevent random rotation of said roller when said roller is at rest.

5. The third-axis input device of a mouse as recited in claim 4, wherein said positioning holes are equally spaced apart each from the other.

6. The third-axis input device of a mouse as recited in claim 4, wherein said plurality of positioning holes are formed as corrugations on said roller, said positioning holes being equally spaced apart each from the other.

7. The third-axis input device of a mouse as recited in claim 6, wherein said corrugations are radially distributed.

8. The third-axis input device of a mouse as recited in claim 7, wherein when one of said positioning holes receives said positioning pole, vertical movement of said roller may be optically detected through reflection of light from said tooth-shaped strips such that said roller functions as both a positioning an encoding device.

* * * * *